Aug. 27, 1940.   H. B. PARKER   2,212,748
AIR CONDITIONING UNIT
Filed Aug. 4, 1938   2 Sheets-Sheet 1

Inventor
Harold B. Parker
By Fred Gerlach
his Atty.

Aug. 27, 1940.  H. B. PARKER  2,212,748
AIR CONDITIONING UNIT
Filed Aug. 4, 1938  2 Sheets-Sheet 2
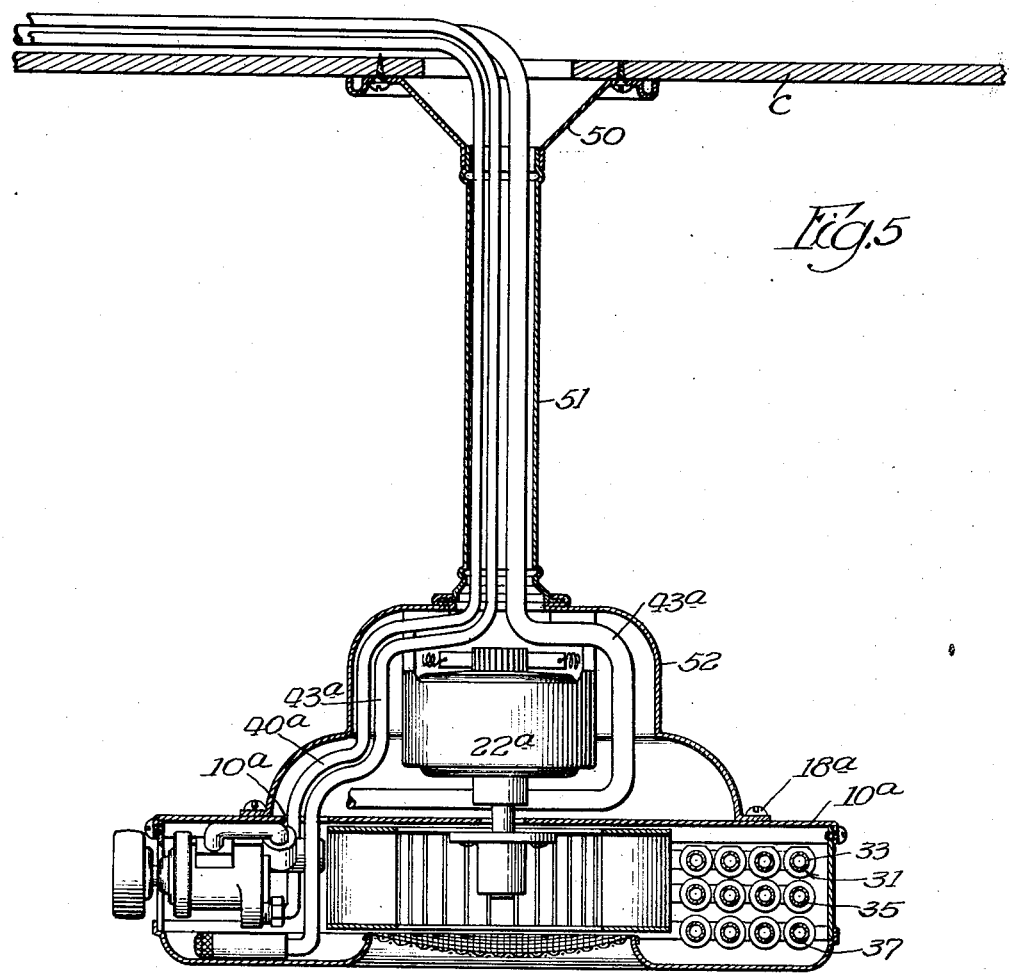
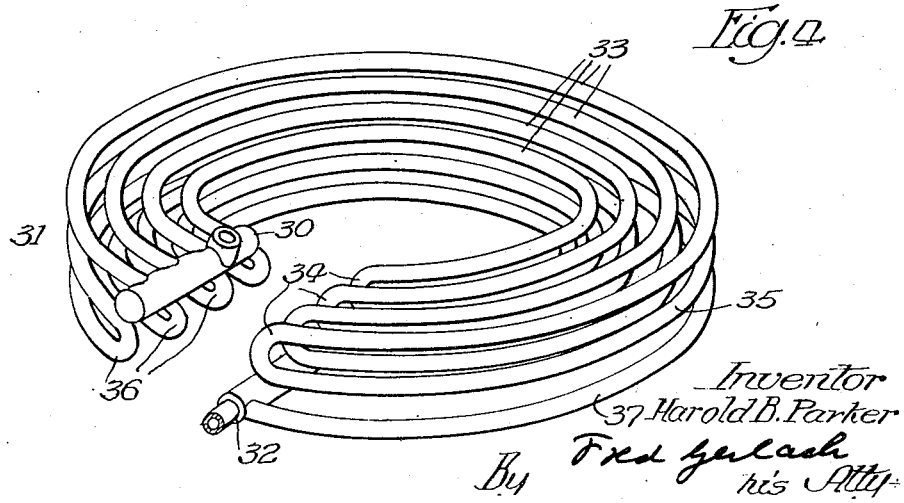
Inventor
Harold B. Parker
By Fred Gerlach
his Atty.

Patented Aug. 27, 1940

2,212,748

UNITED STATES PATENT OFFICE 2,212,748

AIR CONDITIONING UNIT

Harold B. Parker, Pratt, Kans.

Application August 4, 1938, Serial No. 222,970

8 Claims. (Cl. 62—8)

The invention relates to air conditioning units.

One object of the invention is to provide an air conditioning unit which is adapted for convenient installation on vehicles or for stationary application.

Another object is to provide a unit which includes a cooling coil and a fan for forcing the circulation of air and which are constructed for efficiency in cooling and air distribution, and so that the unit can be used where economy of space is a factor.

Another object of the invention is to provide an improved air conditioning unit in which the excess moisture in the air is condensed around the evaporating coil and removed to maintain relatively low humidity in the conditioned air, and to remove stagnant or devitalized air from the housing of the unit.

Other objects of the invention will appear from the detailed description.

The invention consists in the several novel features which are hereinafter set forth and are more particularly defined by claims at the conclusion hereof.

Figure 1:
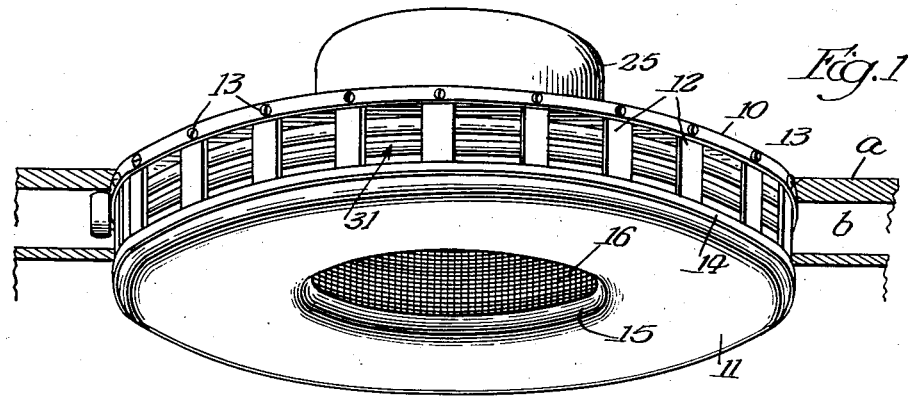
Figure 2:
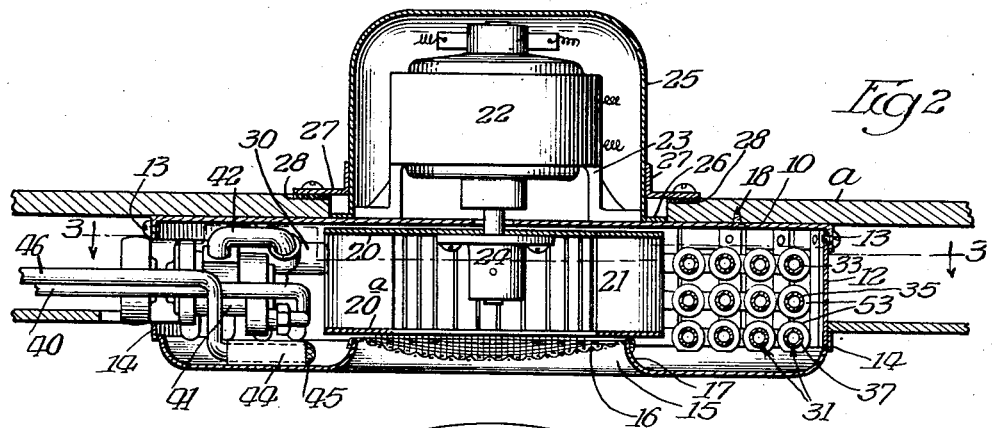
Figure 3:
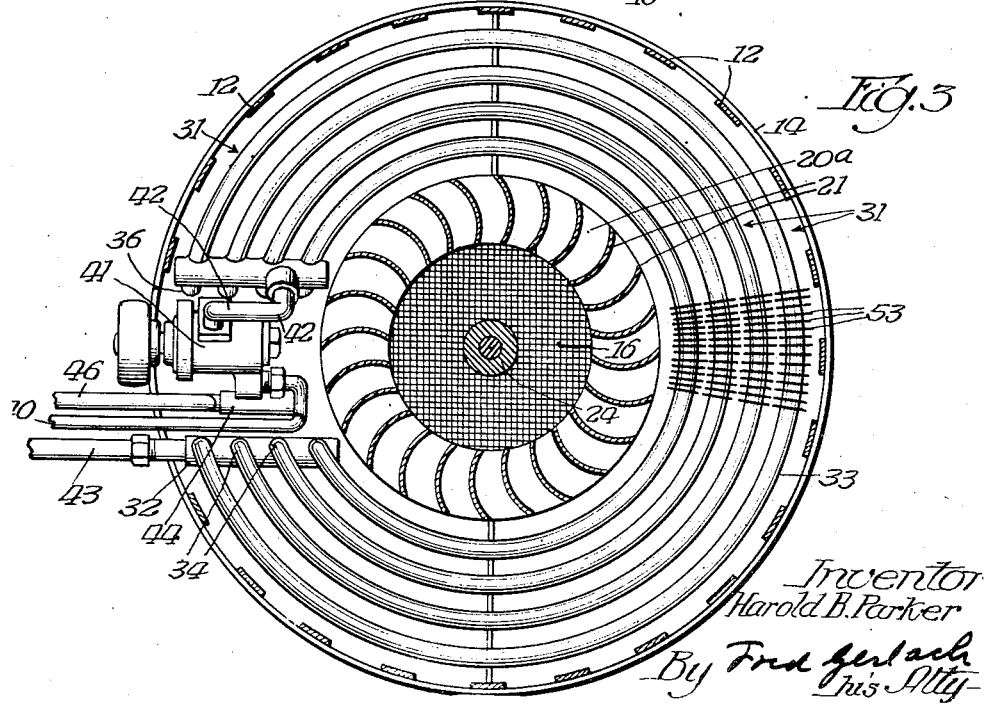

In the drawings: Fig. 1 is a perspective of an air conditioning unit embodying the invention and mounted on the roof of a vehicle for delivering the conditioned air through suitable ducts in or along a wall of a vehicle. Fig. 2 is a vertical section. Fig. 3 is a horizontal section on line 3—3 of Fig. 2. Fig. 4 is a perspective of the evaporating coil. Fig. 5 is a vertical section of a modified form of the invention.

The invention is exemplified in Figs. 1 to 4 in a unit in which the fan for circulating the air and the evaporating coil are contained in a housing which is adapted to be secured on the roof $a$ of a vehicle which is provided with a duct $b$ extending around the unit for delivering the conditioned air to the desired point or points in the body of the vehicle.

The housing comprises a top plate 10 and a lower plate 11 which are secured together in vertically spaced relation by an annular series of vertical strips 12. The lower ends of strips 12 are welded or soldered to the inside of a vertical flange 14 on the lower bottom plate 11 of the housing. The upper ends of the strips are secured by screws 13 to an annular downturned flange on the top plate 10 so the bottom plate and strips may be removed together to provide access to parts in the housing for inspection and repair. Strips 12 are spaced apart to provide an annular series of outlets for the air forced through the housing. The bottom plate 11 is provided with a central opening 15 across which extends a downwardly convex screen 16. Air enters the housing from below through the opening 16. Bottom plate 11 is dished between its flange 14 and inlet opening 16 so that the bottom plate will form an annular pan for catching condensate from the evaporator. The housing is secured to the roof $a$ by any suitable means, such as screws 18.

A Sirocco-type fan which comprises a disk 20 on its upper side, a side-ring 20ª having an inlet opening for air above opening 16 in bottom plate 11, and curved vanes 21 between said upper side and ring, is mounted in and concentrically of the housing. An electric motor 22 is supported by brackets 23 which are secured to the top of top plate 10. The shaft of the motor is extended through plate 10 and is secured to the hub 24 of the fan. A shell 25 extends over and around and encloses the motor and is secured to the roof $a$ by an angle-ring 27 which is secured to shell 25 and has a horizontal flange extending over the roof $a$ and the hole in the roof through which the shell extends. A gasket of sponge-rubber 28 is placed between the horizontal flange of ring 27 and the ceiling to prevent leakage of air into the shell and the housing. When the unit is installed in a vehicle the motor 22 is supported above the roof and enclosed by the shell.

The evaporator comprises a horizontally extending header 30 which receives refrigerant from the high pressure side of a refrigerating system of any suitable construction, a horizontally arranged series of pipes 31, and a header 32 which is connected to deliver the spent refrigerant from said pipes to the low pressure side of a refrigerating system of any suitable construction. Each pipe 31 comprises a convolution 33 extending to a point spaced from the header 30; a vertical bend 34; a corresponding reversely extending convolution 35; a vertical bend 36; and a reversely extending convolution 37 having its end joined to the header 32. The convolutions of the series are arranged in horizontal series and the successive convolutions of each pipe are arranged in vertical series. This arrangement and construction of the pipes 31 provides for substantially uniform cooling of the air radially outward from substantially all portions of the fan and provides a compact construction which adapts the coil for installation in places where space is an important factor. The pipe 40 for delivering high pressure refrigerant to the evaporator is connected to a thermo-pressure regulator 41 of any suitable construction which may be set to automatically deliver the refrigerant to the evaporating coil to maintain a uniform temperature of the air passed over the cooling pipes. A pipe 42 connects the regulator 41 to the header 30. A pipe 43 connects the header 32 to the suction line of the compressor of the refrigerating machine.

The blast of air from the fan passes around the pipes 31 and condenses the moisture on the coils. The excess condensate drops onto the bottom plate 11, which serves as a pan for catching it. The condensate, as it accumulates in the pan, is removed therefrom to avoid excess humidity. For this purpose an intake nozzle 44 with an open strainer 45 in one end, is connected to a suction pipe 46. This pipe, when the unit is used on a vehicle, is connected to the intake manifold of the engine which produces sufficient suction to draw the condensate from the bottom of the housing. When the unit is stationarily installed in a room, pipe 46 is connected to a small vacuum pump for carrying off the condensate, or to the intake manifold of the engine for operating the compressor for the refrigerating system.

The suction or vacuum applied to pipe 46 in practice, will be sufficient to carry off a volume of air, which will remove all the stagnant and devitalized air which accumulates in the housing under the coils. The normal infiltration of air is sufficient to replenish the amount so removed. Any dirt or impurities collected in the housing will also be removed by this suction or vacuum.

In operation, the fan, while being driven, draws air through the opening 16 in the bottom of the housing and forces it laterally in substantially all directions outwardly from the center of the housing and through the annular series of openings between the strips 12. The air contacts with the pipes 31, is cooled as it passes through the housing, and condenses the moisture which accumulates on the pipes. The condensate drops onto the top of the plate 11 where it is drawn off through nozzle 44 and pipe 46. The coil acts as a baffle for dust and dirt in the air and tends to separate them from the air so they will be deposited onto the bottom 11. The condensate is removed by means of suction or vacuum and the stagnant or devitalized air and impurities which are deposited in the lower portion of the housing are also carried off with the condensate. The normal infiltration will replenish the air removed.

In the modification illustrated in Fig. 5, the unit is shown as suspended from a ceiling c. The supporting fixture for the unit comprises a canopy 50 which is secured to the ceiling, a suspension tube 51 secured to canopy 50, and a shell 52 secured to the lower end of tube 51. The top wall 10ª of the housing of the unit is secured by screws 18ª to a flange on the lower end of shell 52. The electric motor 22ª is supported from and enclosed by the shell 52. The pipe 43ª for drawing off the condensate from the bottom of the housing extends through the shell 52, tube 51 and canopy 50 to a vacuum pump. The high pressure line 40ª and the suction line 43ª extend from their respective headers through an opening in the top 10ª of the housing, shell 52, tube 51, canopy 50 and an opening in the ceiling to the refrigerating machine. The fan and evaporating coil are of the same construction and the unit operates as hereinbefore described.

The entire evaporating coil may be provided with fins for heat exchange, some of which are shown at 53 in Figs. 2 and 3.

The invention exemplifies an air conditioning unit which includes an evaporating coil, a fan and a housing which is adapted for convenient installation in vehicles and also for stationary uses. The relative arrangement of the fan and coils makes it possible to discharge air from the housing in all directions and to confine the coil and fan in a housing which occupies little space. The invention also exemplifies a unit of this type in which provision is made for collecting the condensate to prevent excess humidity in the air discharged and in which the stagnant or devitalized air in the lower portion of the housing is continuously removed.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In an air conditioning unit, the combination with a casing having air inlet and outlet openings and a driven fan in and for forcing air through the casing, of a pair of headers in the casing and respectively connected to the high and low pressure sides of a refrigerating system, and a horizontally arranged plurality of evaporator pipes, each comprising a plurality of convolutions disposed vertically of one another and extending back and forth around the fan and vertically extending connecting bends between the convolutions which are disposed vertically of one another, the ends of each pipe being connected to the headers.

2. In an air conditioning unit, the combination with a casing having air inlet and outlet openings and a driven fan in and for forcing air through the casing, of a pair of headers in the casing and respectively connected to the high and low pressure sides of a refrigerating system, and a horizontally arranged series of evaporator pipes, each comprising a plurality of convolutions disposed vertically of one another and extending back and forth around the fan and vertically extending connecting bends between the convolutions which are disposed vertically of one another, the ends of each pipe being connected to the headers.

3. In an air conditioning unit, the combination with a casing having air inlet and outlet openings and a driven fan in and for forcing air through the casing, of a pair of headers in the casing and respectively connected to the high and low pressure sides of a refrigerating system, and a horizontally arranged plurality of evaporator pipes, each comprising a series of convolutions disposed vertically of one another and extending back and forth around the fan and a plurality of vertically extending connecting bends between the convolutions which are disposed vertically of one another, the ends of each pipe being connected to the headers.

4. In an air conditioning unit, the combination with a casing having air inlet and outlet openings and a driven fan in and for forcing air through the casing, of a pair of headers in the casing and respectively connected to the high and low pressure sides of a refrigerating system, and a horizontally arranged plurality of evaporator pipes, each comprising a plurality of convolutions disposed vertically of one another and extending back and forth around the fan and vertically connecting bends spaced apart at one side of the fan and between the ends of the convolutions which are disposed vertically of one another, the ends of the pipes being connected to the headers, respectively, the headers being disposed at the space between the bends.

5. In an air conditioning unit, the combination with a casing having air inlet and outlet openings and a driven fan in and for forcing air through the casing, of a pair of headers in the casing and respectively connected to the high and low pressure sides of a refrigerating system, and a horizontally arranged plurality of evaporator pipes, each comprising a plurality of convolutions disposed vertically of one another and extending back and forth around the fan and vertically connecting bends spaced apart at one side of the fan and between the ends of the convolutions which are disposed vertically of one another, the ends of the pipes being connected to the headers, respectively, and a pressure-regulator in the space between the bends.

6. In an air conditioning unit, the combination with a casing having air inlet and outlet openings and a driven fan in and for forcing air through the casing, of a pair of headers in the casing and respectively connected to the high and low pressure sides of a refrigerating system, and a horizontally arranged plurality of evaporator pipes, each comprising a plurality of convolutions disposed vertically of one another and extending back and forth around the fan and vertically connecting bends spaced apart at one side of the fan and between the ends of the convolutions which are disposed vertically of one another, the ends of the pipes being connected to the headers, respectively, the headers being disposed adjacent the bends, and a pressure-regulator in the space between the bends.

7. In an air conditioning unit, the combination with a fan and an evaporating coil extending around the fan and a motor above and for driving the fan, of a casing for the fan and coil comprising a top plate extending over the fan, a bottom plate below the fan provided with a central opening, and vertically extending substantially flat strips between the outer edges of the bottom plate and the top plate spaced apart circumferentially to form openings through which the air will be discharged laterally after it has passed around the coil, and a screen extending over the central opening in the bottom plate.

8. In an air conditioning unit, the combination with a fan and an evaporating coil extending around the fan and a motor above and for driving the fan, of a casing for the fan and coil comprising a top plate provided with a depending flange, a bottom plate provided with a central opening and upturned flanges at its inner and outer margins, and vertically extending substantially flat strips between the outer flange of the bottom plate and the depending flange of the top plate, and a screen secured on the inner flange and extending over the central opening in the bottom plate.

HAROLD B. PARKER.